US012794549B2

(12) United States Patent
Ozozlu

(10) Patent No.: US 12,794,549 B2
(45) Date of Patent: Nov. 10, 2026

(54) REALTIME DIRECT TO SATELLITE GEOFENCING

(71) Applicant: T-MOBILE INNOVATIONS LLC, Overland Park, KS (US)

(72) Inventor: Akin Ozozlu, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 296 days.

(21) Appl. No.: 18/597,662

(22) Filed: Mar. 6, 2024

(65) Prior Publication Data

US 2025/0286615 A1 Sep. 11, 2025

(51) Int. Cl.
*H04B 7/185* (2006.01)
*H04W 28/02* (2009.01)

(52) U.S. Cl.
CPC ..... *H04B 7/18543* (2013.01); *H04B 7/18513* (2013.01); *H04W 28/0289* (2013.01)

(58) Field of Classification Search
None
See application file for complete search history.

(56) References Cited

U.S. PATENT DOCUMENTS

| | | | | |
|---|---|---|---|---|
| 10,951,357 | B1 * | 3/2021 | Myers | H04L 25/03331 |
| 2015/0365790 | A1 * | 12/2015 | Edge | H04W 76/50 455/456.1 |
| 2017/0251379 | A1 * | 8/2017 | Jong | H04W 16/28 |
| 2018/0062733 | A1 * | 3/2018 | Agarwal | H04W 72/23 |
| 2019/0223198 | A1 * | 7/2019 | Halabian | H04W 16/10 |
| 2020/0396695 | A1 * | 12/2020 | Bhushan | H04B 17/336 |
| 2021/0160813 | A1 * | 5/2021 | Gupta | H04W 24/08 |
| 2021/0376919 | A1 * | 12/2021 | Lin | H04W 28/0831 |
| 2023/0019858 | A1 * | 1/2023 | Scott | H04B 10/112 |

* cited by examiner

*Primary Examiner* — Jay L Vogel

(74) *Attorney, Agent, or Firm* — SHOOK, HARDY & BACON L.L.P.

(57) ABSTRACT

Embodiments of the present disclosure describe systems and methods for dynamic spectrum management and interference mitigation in mobile communications through a network of extraterrestrial base stations. Embodiments herein monitor communication traffic across various geographic areas and generate traffic heatmaps that allow for data analysis of and visualization of traffic intensity and distribution. The disclosed methods identify areas exceeding predefined congestion or interference thresholds within these heatmaps. In response, the system dynamically adjusts downlink signal parameters of the extraterrestrial base stations, such as muting or reducing signal strength in congested areas, to mitigate interference.

20 Claims, 6 Drawing Sheets

REALTIME DIRECT TO SATELLITE GEOFENCING

SUMMARY

The present disclosure is directed to improving the mitigation of the effects of extraterrestrial base stations and terrestrial wireless base stations concurrently operating within a geographic region, substantially as shown and/or described in connection with at least one of the Figures, and as set forth more completely in the claims.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
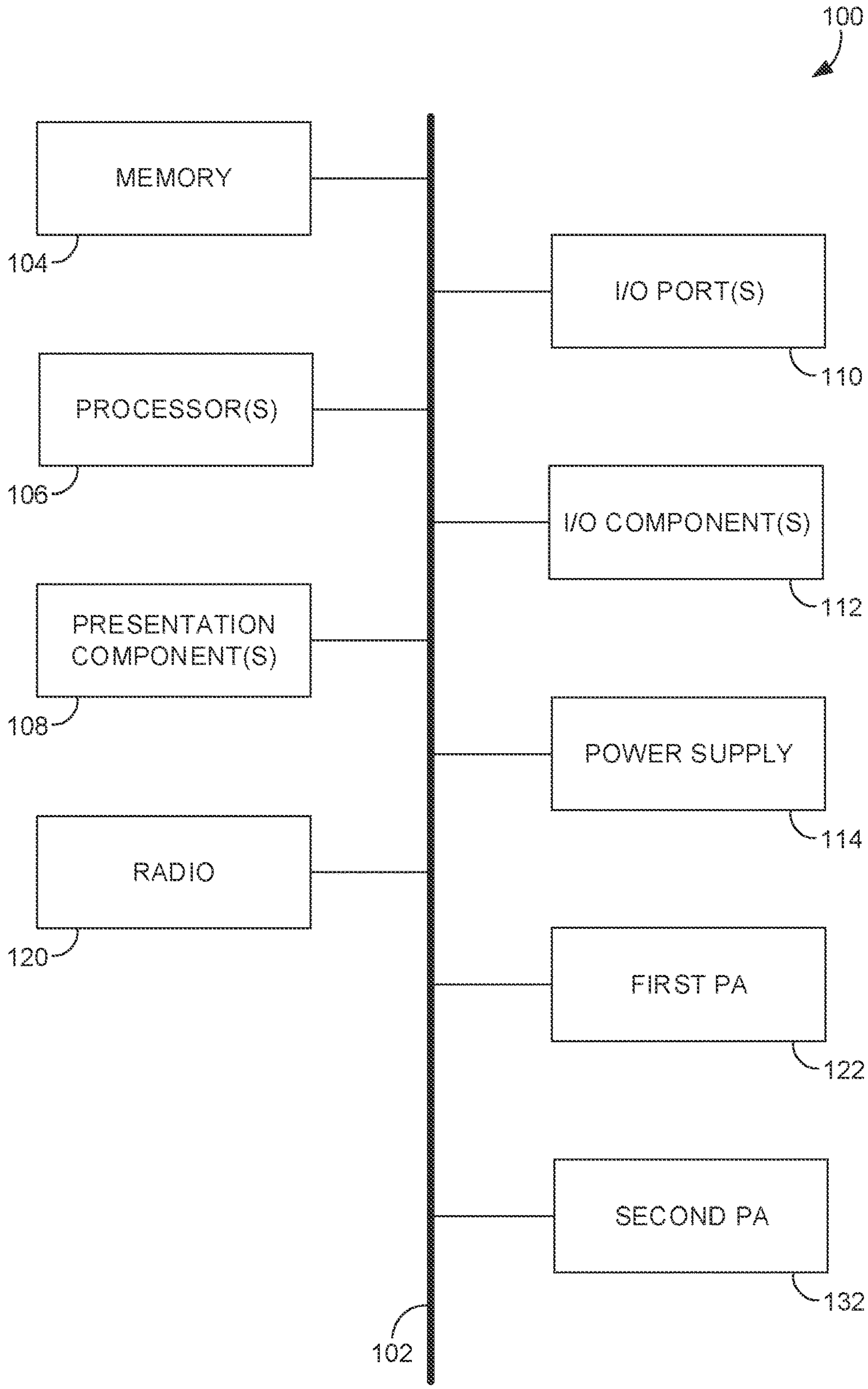
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32*d* Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like. The term "node" is used to refer to network access technology for the provision of wireless telecommunication services from a base station to one or more electronic devices, such as an eNodeB, gNodeB, etc. The term "cell" is used to describe one or more hardware and software components of a base station that are configured to provide wireless communication service to a geographic area.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, the advent and integration of extraterrestrial base stations in the mobile communications network mark an evolution from the traditional terrestrial-based systems. These satellite networks have been instrumental in extending connectivity to geographically isolated regions, thereby overcoming the limitations imposed by terrestrial infrastructures such as geographical barriers and regulatory constraints. Satellite base stations facilitate a broader coverage area, enabling a seamless global communication network. This technological leap has been driven by the necessity to bridge the connectivity gap in remote areas, where laying down terrestrial network infrastructures is neither feasible nor economically viable. The unique positioning of these stations allows for an uninterrupted line of sight communication, enhancing signal reliability and network performance across vast distances.

Conventionally, the coexistence of terrestrial and extraterrestrial networks has been marred by significant congestion challenges. These issues are in part due to the complex interplay between ground-based network demands and the satellite communication systems, often leading to bandwidth limitations and signal interference. The conventional approach to managing this congestion involved the use of detailed loading maps designed to optimize network traffic flow. However, these maps entail the transmission and processing of large volumes of data, exacerbating the already strained bandwidth resources. The reliance on such data-heavy solutions has posed substantial challenges in achieving efficient spectrum management, particularly in high-demand scenarios where real-time data exchange is critical.

Addressing the conventional bottlenecks, the disclosed technique introduces a sophisticated method for utilizing extraterrestrial base stations beyond mere coverage expansion. By focusing on dynamic traffic management through the generation of detailed traffic heatmaps on board satellites, this method innovatively circumvents the limitations of data-heavy loading maps. These heatmaps are designed to reflect real-time network traffic conditions with high precision, enabling the identification of congestion hotspots without overwhelming the network with excessive data demands. This strategic approach allows for proactive spectrum management, effectively mitigating interference between terrestrial and extraterrestrial networks. The implementation of such techniques signifies a significant departure from traditional congestion management methods, leveraging the potential of satellite technology to enhance network efficiency and reliability in a data-intensive world.

Accordingly, a first aspect of the present disclosure provides a system for mitigating interference caused by one or more satellite base stations providing coverage over a geographic area having one or more terrestrial base stations. The system comprises one or more computer processing components configured to perform operations. The operations comprises first providing downlink coverage to a first geographical area via a plurality of extraterrestrial base stations. The operations next generate a traffic heatmap for the first geographical area using data collected by said plurality of extraterrestrial base stations, wherein the heatmap reflects the intensity and distribution of communication traffic across the area. Next, the operations identify a second geographical area within the first geographical area, based on the heatmap, where the communication traffic exceeds a predetermined threshold indicative of potential congestion or interference. Next, the operations cause one or more extraterrestrial base stations, initially scheduled to provide downlink coverage to the second geographical area, to mute or reduce downlink signals to said second geographical area, thereby mitigating congestion and interference within the network.

A second aspect of the present disclosure provides a method for mitigating interference caused by one or more satellite base stations providing coverage over a geographic area having one or more terrestrial base stations. The method comprises providing downlink coverage to a first geographical area via a plurality of extraterrestrial base stations. The method further comprises generating a traffic heatmap for the first geographical area using data collected by said plurality of extraterrestrial base stations, wherein the heatmap reflects the intensity and distribution of communication traffic across the area. Additionally the method comprises identifying a second geographical area within the first geographical area, based on the heatmap, where the communication traffic exceeds a predetermined threshold indicative of potential congestion or interference. The method finally comprises causing one or more extraterrestrial base stations, initially scheduled to provide downlink coverage to the second geographical area, to mute or reduce downlink signals to said second geographical area, thereby mitigating congestion and interference within the network.

Another aspect of the present disclosure is directed to a non-transitory computer readable media having instructions stored thereon that, when executed by one or more computer processing components, cause the one or more computer processing components to perform a method for mitigating interference caused by one or more satellite base stations providing coverage over a geographic area having one or more terrestrial base stations. The method comprises providing downlink coverage to a first geographical area via a plurality of extraterrestrial base stations. The method further comprises generating a traffic heatmap for the first geographical area using data collected by said plurality of extraterrestrial base stations, wherein the heatmap reflects the intensity and distribution of communication traffic across the area. Additionally the method comprises identifying a second geographical area within the first geographical area, based on the heatmap, where the communication traffic exceeds a predetermined threshold indicative of potential congestion or interference. The method finally comprises causing one or more extraterrestrial base stations, initially scheduled to provide downlink coverage to the second geographical area, to mute or reduce downlink signals to said second geographical area, thereby mitigating congestion and interference within the network.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114.

Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. In addition, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, non-removable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 120 represents one or more radios that facilitate communication with one or more wireless networks using one or more wireless links. In aspects, the one or more radios 120 utilize a first transmitter 122 to communicate with a wireless network on a first wireless link and the second transmitter 132 to communicate on a second wireless link. Though a single radio is shown, it is expressly conceived that a computing device with more than one radio could facilitate communication over one or more wireless links with one or more wireless networks via both the first transmitter 122 and the second transmitter 132. Illustrative wireless telecommunications technologies include CDMA, GPRS, TDMA, GSM, and the like. The radio 120 may carry wireless communication functions or operations using any number of desirable wireless communication protocols, including 802.11 (Wi-Fi), WiMAX, LTE, 3G, 4G, LTE, 5G, NR, VoLTE, or other VoIP communications. In aspects, the radio 120 may be configured to communicate using the same protocol but in other aspects, they may be configured to communicate using different protocols. In some embodiments, including those that both radios or both wireless links are configured for communicating using the same protocol, the radio 120 may be configured to communicate on distinct frequencies or frequency bands (e.g., as part of a carrier aggregation scheme). As can be appreciated, in various embodiments, the radio 120 can be configured to support multiple technologies and/or multiple frequencies; for example, the radio 120 may be configured to communicate with a base station according to a cellular communication protocol (e.g., 4G, 5G, 6G, or the like), and may configured to communicate with one or more other computing devices according to a local area communication protocol (e.g., IEEE 802.11 series, Bluetooth, NFC, z-wave, or the like).

Figure 2:
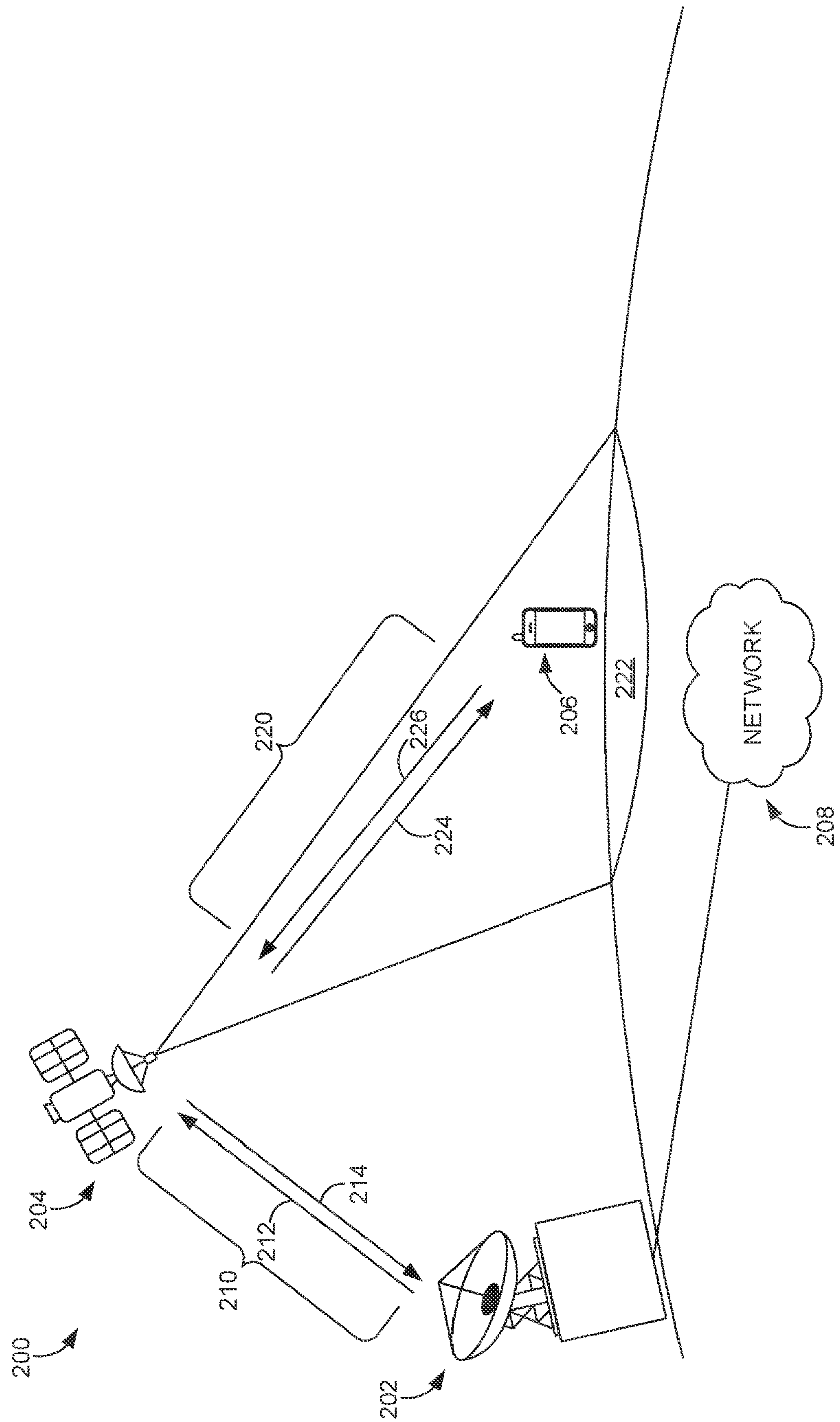
FIG. 2 depicts a network environment in which implementations of the present disclosure may be employed, in accordance with aspects herein.

Turning now to FIG. 2, an exemplary network environment is illustrated in which implementations of the present disclosure may be employed. Such a network environment is illustrated and designated generally as network environment 200. At a high level the network environment 200 comprises a gateway 202, a satellite 204 of a satellite radio access network (RAN), a UE 206, and a network 208. Satellite 204 or any other satellite may be referred to as an extraterrestrial base station herein. In some embodiments, an extraterrestrial base station refers to a satellite such as satellite 204 or space station. Though the composition of network environment 200 illustrates objects in the singular, it should be understood that more than one of each component is expressly conceived as being within the bounds of the present disclosure; for example, the network environment 200 may comprise multiple gateways, multiple distinct networks, multiple UEs, multiple satellites that communicate with a single gateway, and the like. Similarly, though certain objects of network environment 200 are illustrated in a certain form, it should be understood that they may take other forms; for example, even though the UE 206 is illustrated as a cellular phone, a UE suitable for implementations with the present disclosure may be any computing device having any one or more aspects described with respect to FIG. 1.

The network environment 200 includes a gateway 202 communicatively connected to the network 208 and the satellite 204. The gateway 202 may be connected to the network 208 via one or more wireless or wired connections and is connected to the satellite 204 via a feeder link 210. The gateway 202 may take the form of a device or a system of components configured to communicate with the UE 206 via the satellite 204 and to provide an interface between the network 208 and the satellite 204. Generally, the gateway 202 utilizes one or more antennas to transmit signals to the satellite 204 via a forward uplink 212 and to receive signals from the satellite 204 via a return downlink 214. The gateway 202 may communicate with a plurality of satellites, including the satellite 204. The network 208 comprises any one or more public or private networks, any one or more of which may be configured as a satellite network, a publicly switched telephony network (PSTN), or a cellular telecommunications network. In aspects, the network 208 may comprise a satellite network connecting a plurality of gateways (including the gateway 202) to other networks, a cellular core network (e.g., a 4G, 5G, of 6G core network, an IMS network, and the like), and a data network. In such aspects, each of the satellite network and the cellular core network may be associated with a network identifier such as a public land mobile network (PLMN), a mobile country code, a mobile network code, or the like, wherein the network identifier associated with the satellite network is the same or different than the network identifier associated with the cellular network.

The network environment 200 includes one or more satellites, represented by satellite 204. The satellite 204 is generally configured to relay communications between the gateway 202 and the UE 206. The satellite 204 communicates with the gateway using the feeder link 210 and communicates with the UE 206 using a user link 220. The user link 220 comprises a forward downlink 224 used to communicate signals from the satellite 204 to the UE 206 and a return uplink 226 used to communicate signals from the UE 206 to the satellite 204. The satellite 204 may communicate with the UE 206 using any wireless telecommunication protocol desired by a network operator, including but not limited to 3G, 4G, 5G, 6G, 802.11x and the like. Though shown as having a single beam providing coverage to a satellite coverage area 222, the satellite 204 may be configured to utilize a plurality of individual beams to communicate with multiple different areas at or near the same time. Similarly, though a single forward downlink 224 and a single return uplink 226 are illustrated, the UE 206 may utilize multiple downlinks and/or multiple uplinks to communicate with the satellite 204, using any one or more frequencies as desired by a satellite or network operator.

Generally, the satellite 204 is characterized by its orbit around the Earth. The orbit of any particular satellite will vary by operator desire and/or intended use; for example, a satellite suitable for use with the present disclosure may be characterized by its maximum orbital altitude and/or orbital period as Low Earth Orbit (LEO), Medium Earth Orbit (MEO), and High Earth Orbit (HEO) —also referred to herein as characterizing an orbital plane. Though not rigidly defined, an LEO satellite may orbit with a maximum orbital altitude of less than approximately 1,250 miles, an MEO satellite may orbit with a maximum orbital altitude generally between 1,250 and 22,000 miles, and an HEO satellite may orbit with a maximum orbital altitude of greater than approximately 22,000 miles. In some, but not all cases, a satellite in HEO may be considered geosynchronous (i.e., geosynchronous Earth orbit (GEO)) on the basis that its orbital period is approximately equal to the length of a sidereal or solar day (approximately 24 hours); generally, a satellite in geosynchronous orbit will appear to be in the same position relative to a fixed point on the surface of the Earth at the same time each day. A geostationary orbit is a special type of geosynchronous orbit with the Earth's equator with each of an eccentricity and inclination equal to zero. Some satellites in HEO and all that are in LEO or MEO have an orbital period that is different than the length of a sidereal/solar day and are considered to be non-geosynchronous and do not remain stationary relative to a fixed position on the surface of the Earth. As used herein, a satellite in LEO has a lower orbital plane than a satellite in MEO or HEO, an MEO satellite has a higher orbital plane than a satellite in LEO, and an HEO satellite has a higher orbital plane than a satellite in LEO or MEO.

Figure 3:
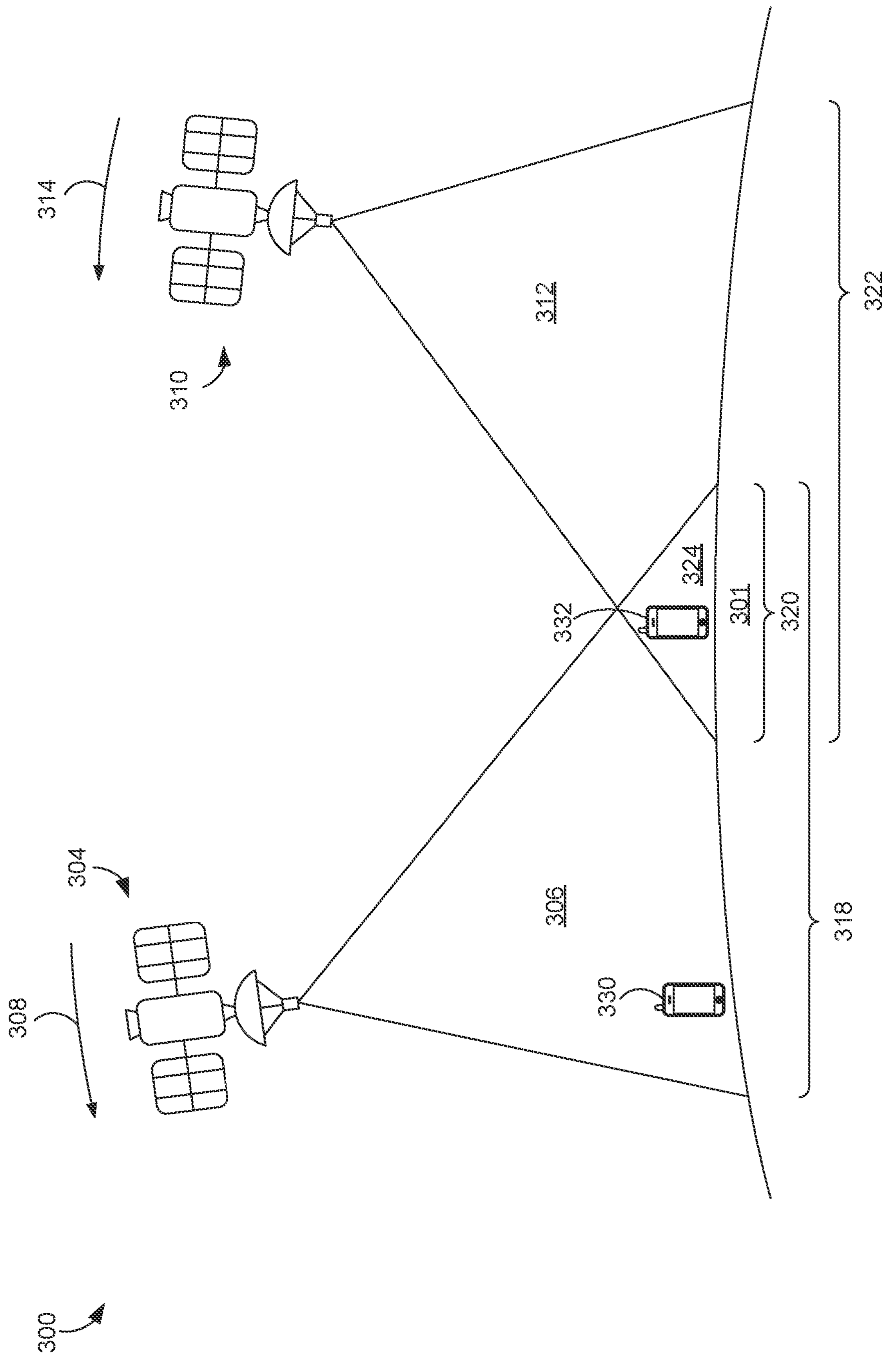
FIG. 3 depicts a network environment in which implementations of the present disclosure may be employed, in accordance with aspects herein.

Turning now to FIG. 3, an exemplary network environment is illustrated in which implementations of the present disclosure may be employed. Such a network environment is illustrated and designated generally as network environment 300. The network environment 300 generally comprises one or more satellites, such as a first satellite 304 and a second satellite 310 and a first UE 330 at or near a surface of the Earth 301. The network environment 300 includes one or more components or functions of the network environment 200 of FIG. 2; for example, each of the first satellite 304 and the second satellite 310 of the network environment 300 have any one or more aspects of the satellite 204, and the first UE 330 of the network environment 300 have any one or more aspects of the UE 206 of network environment 200 in FIG. 2. Further, the first UE 330 and the second UE 332 are configured with one or more location services, when utilized by the first UE 330 and second UE 332, allow the first UE 330 and second UE 332 to determine their location on the Earth 301; such location services may relevantly include one or more satellite location services (e.g., global positioning system (GPS)).

In one example, the first satellite 304 has a specific orbit that determines its position relative to the Earth 301, affecting where it projects its coverage. A first coverage area 306 is the primary zone that the first satellite 304 can service. The first coverage area 306 is a three-dimensional region in space that represents the range within which devices or relay stations can communicate directly with the first satellite 304. A first Earth coverage area 318 represents the region on the surface of Earth 301 that falls within the first coverage area 306. Devices, such as the first UE 330 or communication towers within the first coverage area 306, can establish a connection with the first satellite 304. The exact shape and size of the first Earth coverage area 318 and first coverage area 306 depend on the satellite's altitude, orbit inclination, and the communication beam's management mechanism.

The second satellite 310 has its own orbit, which determines where its coverage area is projected on Earth 301. A second coverage area 312 is a primary serviceable zone for second satellite 310. Devices or relay stations within the second coverage area 312 can establish communication with the second satellite 310. Translated from the second coverage area 312, the second Earth coverage area 322 is where devices can connect with the second satellite 310. The shape and size of second coverage area 312 are influenced by various orbital and technical parameters. Given the constant movement of satellites and the vast expanse of their coverage areas, there are instances where Earth coverage areas of multiple satellites overlap. In the current example described in FIG. 3, the first Earth coverage area 318 of the first satellite 304 and the second Earth coverage area 322 of the second satellite 310 intersect, creating an overlapping coverage area 324 and an overlapping Earth coverage area 320. Devices within the overlapping coverage area 324 can connect to either the first satellite 304 or the second satellite 310. Additionally, the shape and location of the coverage areas can be manipulated so the overlapping coverage area 324 is reduced in size and UEs can be serviced by a single satellite.

In each of the examples described herein, the satellites discussed can determine the network traffic within its own respective geographic coverage area. Each satellite monitors the volume and patterns of data transmission below, enabling a precise understanding of the dynamic needs of the area it oversees. For example, satellites specifically monitor uplink signals and other signals from UEs, such as UE 324 active on Earth's surface to gauge network traffic within their geographic coverage areas. This monitoring includes analyzing the strength, frequency, and pattern of signals emitted by UEs, enabling satellites to accurately assess the volume of data being transmitted and received.

Figure 4:
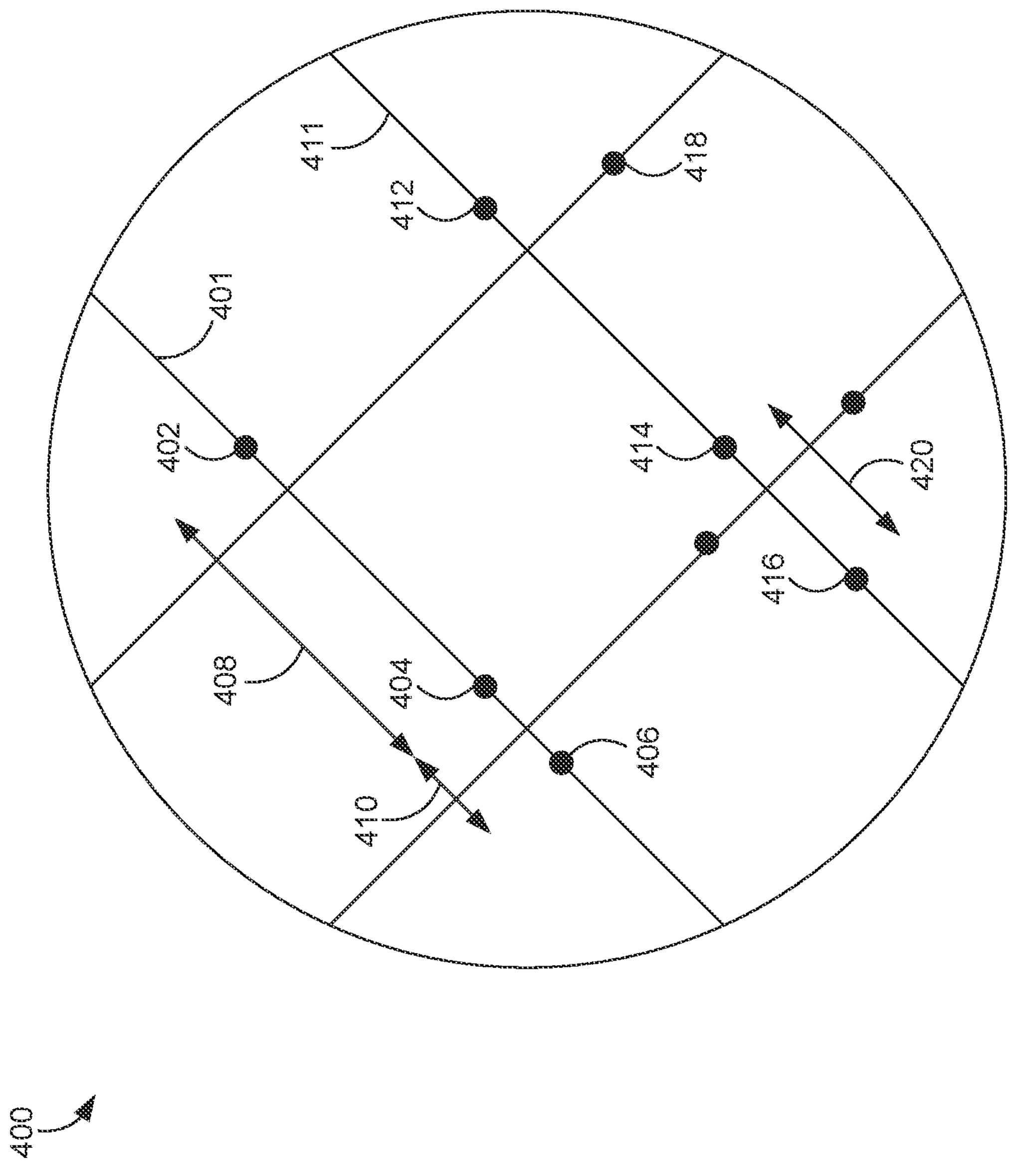
FIG. 4 depicts a network environment in which implementations of the present disclosure may be employed, in accordance with aspects herein.

Turning now to FIG. 4, external source data comprising extraterrestrial constellation information is illustrated. The constellation information at least partially represents a satellite constellation 400. The constellation data may comprise indications that the satellite constellation includes one or more satellites; for example, the external constellation data may comprise a first satellite 402 which may represent the first satellite 304 of FIG. 3, a second satellite 404 which may represent the second satellite 310 of FIG. 3, a third satellite 406, a fourth satellite 412, a fifth satellite 414, and a sixth satellite 416. The constellation data may include indications that each of the first satellite 402, the second satellite 404, and the third satellite 406 travel along a first orbital path 401. The first satellite 402 may be separated from the second satellite 404 by a first distance 408 and the second satellite 404 may be separated from the third satellite 406 by a second distance 410, wherein the first distance 408 may be equal to or different than the second distance 410. Similarly, constellation data may comprise information that each of the fourth satellite 412, the fifth satellite 414, and the sixth satellite 416 travel along a second orbital path 411. The fourth satellite 412 may be separated from the second satellite 404 by a third distance 418 and the fifth satellite 414 may be separated from the sixth satellite 416 by a fourth distance 420, wherein the third distance 418 may be equal to or different than the fourth distance 420, the first distance 408, and the second distance 410.

Based on the external constellation data comprising the time, location, and track of one or more satellites, the first satellite 304 and/or the second satellite 310 of FIG. 3 can model, calculate, or otherwise determine a current position of the coverage areas for the first satellite 304 and the second satellite 310 on the surface of the Earth and other satellites found within the constellation such as shown with respect to FIG. 4. Further, based on the current positions of the first satellite 304 and/or the second satellite 310 of FIG. 3, and the movements of the first satellite 304 and the second satellite 310, the first satellite 304 can model, calculate, or otherwise determine a predicted future coverage area of the first satellite 304 and the second satellite 310.

Figure 5:
FIG. 5 depicts a network environment in which implementations of the present disclosure may be employed, in accordance with aspects herein.

FIG. 5 illustrates a comprehensive heatmap generated through the collaborative efforts of satellites within a specified coverage area, designed to monitor network traffic flow. This requires the satellites to know their location as described with respect to FIG. 3 and FIG. 4. FIG. 5 describes how a diverse array of satellites contributes to downlink coverage across an entire geographic region, segmented into areas of low traffic 502, moderate traffic 506, and high traffic 504. The segmentation process involves a first group of satellites monitoring low traffic 502 regions, a second group overseeing high traffic 504 areas, and a third group managing moderate traffic 506 zones. The innovative aspect of this system lies in its ability to identify these varying traffic densities and communicate this information across the satellite network, facilitating the creation of a detailed heatmap. This heatmap enables each satellite to have a clear understanding of the traffic dynamics within its immediate coverage area as well as those of adjacent areas.

In the network system depicted in FIG. 5, inter satellite communication allows for the communication of network traffic between satellites for the generation of the heatmap at each satellite, particularly through the utilization of laser communication technologies. This method allows for high-speed, secure data transfer between satellites, enabling them to share comprehensive network traffic information swiftly and efficiently. When a satellite detects changes in traffic density within its coverage area—be it a shift from low to moderate or moderate to high traffic—it relays this data via laser links to neighboring satellites. This inter-satellite communication is critical for updating the traffic heatmap in real-time, ensuring that each satellite operating within the entire constellation has the latest data to manage its downlink coverage effectively.

In an additional aspect, the system provides for communication between satellites through ground-based network control centers. Once a satellite gathers and processes traffic data, it communicates this information back to a central network hub. This hub acts as a data aggregator, compiling traffic insights from across the satellite network to update the global heatmap. This centralized approach allows for a coordinated response to changing traffic conditions, optimizing resource allocation across the network.

Furthermore, the network's data-sharing mechanism facilitates dynamic adjustments in satellite operations to manage network traffic efficiently. Utilizing the updated heatmap, satellites can adapt their downlink strategies to effectively address congestion in high-traffic regions or to improve service in areas with lower traffic volumes. For instance, upon detecting that the traffic in a designated coverage area surpasses a predefined threshold, the corresponding satellite is instructed to modify its downlink signals. This modification could involve muting the downlink signals or reducing their strength, thereby alleviating congestion and enhancing the overall network performance.

Figure 6:
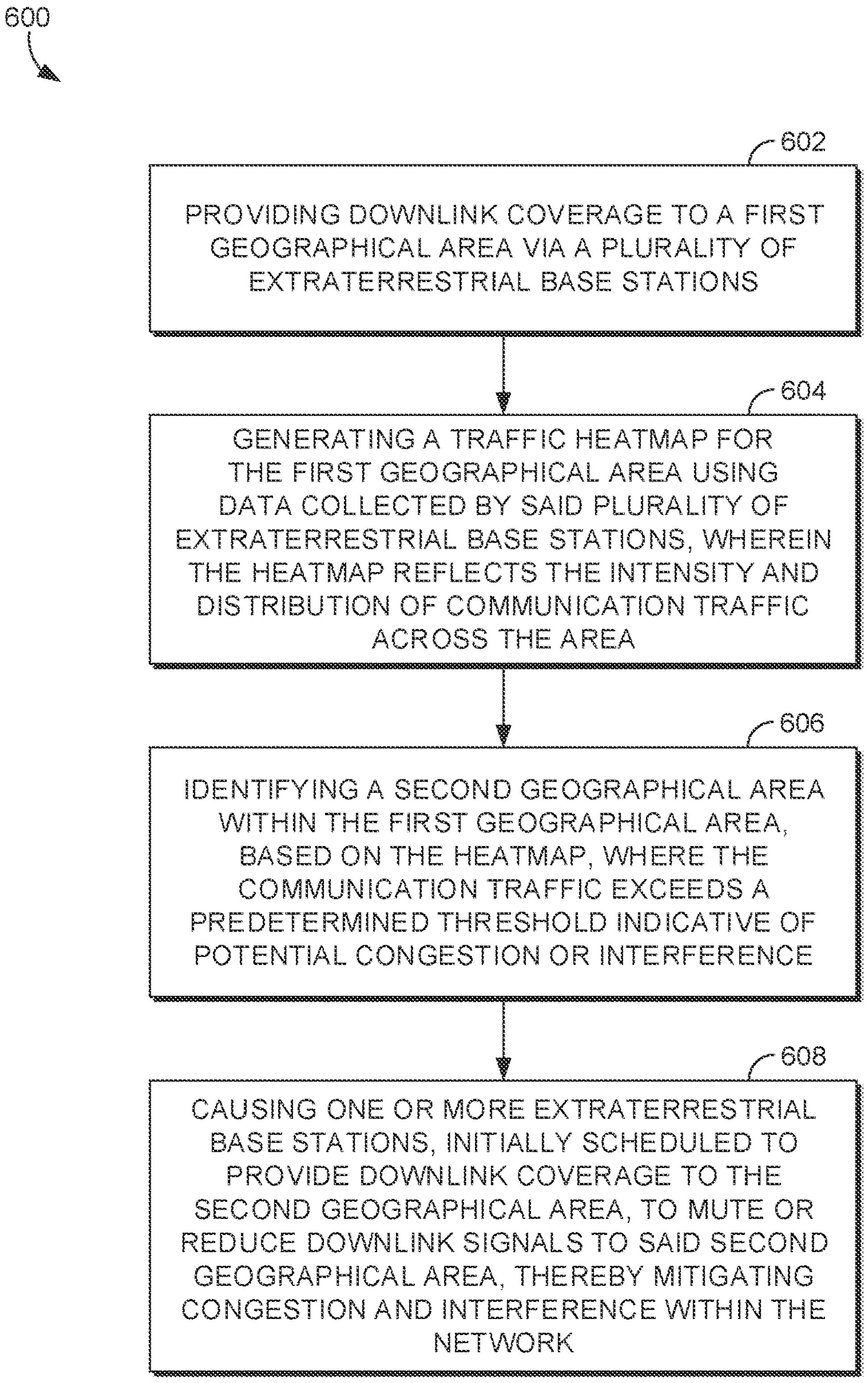
FIG. 6 depicts a flow diagram of a method for mitigating interference, in accordance with aspects herein.

FIG. 6 illustrates a flow diagram of a method for dynamic spectrum management and interference mitigation in mobile communications, in line with the described technological advancements. The method 600 commences at block 602 with providing downlink coverage to a first geographical area via a plurality of extraterrestrial base stations. A network of extraterrestrial base stations, such as satellites, is employed to provide comprehensive downlink coverage across a broad geographical area, such as described with respect to FIG. 5. This step establishes a baseline of communication services, ensuring that every part of the designated area has access to the network. The deployment of multiple satellites allows for a wide-reaching coverage that can adapt to varying geographic and environmental conditions, ensuring consistent service availability.

At block 604, a traffic heatmap is generated for the first geographical area using data collected by the plurality of extraterrestrial base stations, wherein the heatmap reflects the intensity and distribution of communication traffic across the area. The collected data from the network of satellites is analyzed to create a detailed traffic heatmap of the first geographical area. This heatmap serves as a data representation of the intensity and distribution of communication traffic, identifying zones of varying traffic density. By analyzing this data, satellite base stations operators can identify areas of high usage that may require modification of satellite downlink communications.

Additionally, at block 606 a second geographical area is identified within the first geographical area, based on the heatmap, where the communication traffic exceeds a predetermined threshold indicative of potential congestion or interference. Following the heatmap analysis, this step involves the identification of a specific second geographical area within the broader first area where traffic levels surpass a predefined threshold. This threshold is not static; it is adjustable based on historical traffic patterns and predictive modeling of network demand, allowing for a more nuanced and proactive approach to managing congestion. This dynamic threshold setting serves as an indicator of potential congestion or interference, reflecting a sophisticated understanding of expected service quality and network capacity.

Subsequently, at block 608, causing one or more extraterrestrial base stations, initially scheduled to provide downlink coverage to the second geographical area, to mute or reduce downlink signals to said second geographical area, thereby mitigating congestion and interference within the network. The final step in the method entails adjusting the operations of one or more satellites that were initially assigned to cover the identified high-traffic area. Based on the insights gained from the heatmap, these satellites are instructed to either mute or reduce their downlink signals to the congested area. This strategic reduction in signal strength is designed to alleviate congestion and minimize interference, ensuring that the network remains stable and efficient.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents

What is claimed is:

1. A non-transitory computer readable media having instructions stored thereon that, when executed by one or more computer processing components, cause the one or more computer processing components to perform a method for dynamic spectrum management and interference mitigation in mobile communications, the method comprising:

providing downlink coverage to a first geographical area via a plurality of extraterrestrial base stations, wherein the first geographical area is concurrently served by one or more terrestrial base stations;

generating a traffic heatmap for the first geographical area using data collected by the plurality of extraterrestrial base stations, wherein the traffic heatmap reflects an intensity and distribution of communication traffic across the first geographical area and identifies co-channel interference from concurrent operation of the plurality of extraterrestrial base stations and the one or more terrestrial base stations;

identifying a second geographical area within the first geographical area, based on the traffic heatmap, where the communication traffic exceeds a predetermined threshold indicating co-channel interference between the plurality of extraterrestrial base stations and the one or more terrestrial base stations; and causing one or more extraterrestrial base stations, initially scheduled to provide downlink coverage to the second geographical area, to adjust signal parameters to the second geographical area.

2. The non-transitory computer readable media of claim 1, wherein the generation of the traffic heatmap includes real-time analysis of communication traffic.

3. The non-transitory computer readable media of claim 1, wherein generating the traffic heatmap includes one or more laser communications between the plurality of extraterrestrial base stations to exchange traffic data.

4. The non-transitory computer readable media of claim 1, further comprising communicating adjustments in downlink coverage to ground-based network control centers for centralized traffic management.

5. The non-transitory computer readable media of claim 1, wherein dynamic adjustment of signal parameters includes muting downlink signals in high-traffic regions.

6. The non-transitory computer readable media of claim 1, wherein the adjustment of signal parameters includes reducing a strength of downlink signals based on a severity of traffic detected.

7. The non-transitory computer readable media of claim 1, further comprising rerouting data traffic to underutilized extraterrestrial base stations.

8. The non-transitory computer readable media of claim 1, wherein the predetermined threshold is adjustable based on historical traffic patterns and predictive modeling of network demand.

9. The non-transitory computer readable media of claim 1, wherein the extraterrestrial base stations comprise radio frequency detectors for monitoring uplink and downlink traffic.

10. A system for dynamic spectrum management and interference mitigation in mobile communications, the system comprising:

a network of extraterrestrial base stations configured to monitor communication traffic, wherein the communication traffic is within a geographical area concurrently served by one or more terrestrial base stations;

data processing units within each extraterrestrial base station for analyzing the communication traffic and generating traffic heatmaps based on the communication traffic, wherein the traffic heatmaps identify co-channel interference from concurrent operation of the network of extraterrestrial base stations and the one or more terrestrial base stations; and a communication module configured to adjust downlink signal parameters based on the traffic heatmaps.

11. The system of claim 10, wherein the network of extraterrestrial base stations comprise radio frequency detectors for monitoring uplink and downlink traffic.

12. The system of claim 10, further comprising inter-satellite laser communication channels for real-time data exchange.

13. The system of claim 10, wherein the adjustment of downlink signal parameters includes muting downlink signals.

14. The system of claim 10, wherein the adjustment of downlink signal parameters includes reducing signal strength of the downlink signal.

15. The system of claim 10, wherein the generation of the traffic heatmaps includes real-time analysis of communication traffic.

16. A method for dynamic spectrum management and interference mitigation in mobile communications, the method comprising:

monitoring network traffic across different geographic areas using a constellation of extraterrestrial base stations, wherein the different geographic areas are concurrently served by one or more terrestrial base stations;

generating traffic heatmaps that depict traffic intensity and distribution based on data collected from the constellation of extraterrestrial base stations, wherein the traffic heatmaps identify co-channel interference from concurrent operation of the constellation of extraterrestrial base stations and the one or more terrestrial base stations;

identifying one or more regions where traffic exceeds a predetermined threshold indicating co-channel interference between the constellation of extraterrestrial base stations and the one or more terrestrial base stations using the generated heatmaps; and dynamically adjusting downlink coverage by modifying signal parameters of extraterrestrial base stations to mitigate identified congestion or interference.

17. The method of claim 16, wherein generating traffic heatmaps includes utilizing laser communication between satellites to exchange traffic data.

18. The method of claim 16, wherein dynamic adjustment of signal parameters includes muting downlink signals.

19. The method of claim 16, wherein the predetermined threshold is adjustable based on historical traffic patterns and predictive modeling of network demand.

20. The method of claim 16, further comprising communicating adjustments in downlink coverage to ground-based network control centers for centralized traffic management.

* * * * *